United States Patent
Gouveia (10) Patent No.: US 10,812,520 B2
(45) Date of Patent: Oct. 20, 2020

(54) SYSTEMS AND METHODS FOR EXTERNAL DETECTION OF MISCONFIGURED SYSTEMS

(71) Applicant: BitSight Technologies, Inc., Cambridge, MA (US)

(72) Inventor: Joao Gouveia, Brejos de Azeitao (PT)

(73) Assignee: BitSight Technologies, Inc., Boston, MA (US)

( * ) Notice: Subject to any disclaimer, the term of this patent is extended or adjusted under 35 U.S.C. 154(b) by 0 days.

(21) Appl. No.: 15/954,921

(22) Filed: Apr. 17, 2018

(65) Prior Publication Data

US 2019/0319979 A1    Oct. 17, 2019

(51) Int. Cl.
H04L 29/06    (2006.01)
H04L 29/12    (2006.01)

(52) U.S. Cl.
CPC ........ H04L 63/1433 (2013.01); H04L 61/302 (2013.01)

(58) Field of Classification Search
CPC .......................... H04L 63/1433; H04L 61/302
See application file for complete search history.

(56) References Cited

U.S. PATENT DOCUMENTS

| | | |
|---|---|---|
| 5,867,799 A | 2/1999 | Lang et al. |
| 6,016,475 A | 1/2000 | Miller et al. |
| 6,792,401 B1 | 9/2004 | Nigro et al. |
| D525,264 S | 7/2006 | Chotai et al. |
| D525,629 S | 7/2006 | Chotai et al. |
| 7,100,195 B1 | 8/2006 | Underwood |
| 7,194,769 B2 | 3/2007 | Lippmann et al. |
| 7,290,275 B2 | 10/2007 | Baudoin et al. |
| D604,740 S | 11/2009 | Matheny et al. |
| 7,650,570 B2 | 1/2010 | Torrens et al. |
| 7,747,778 B1 | 6/2010 | King et al. |
| 7,748,038 B2 | 6/2010 | Olivier et al. |
| 7,827,607 B2 | 11/2010 | Sobel et al. |

(Continued)

FOREIGN PATENT DOCUMENTS

| | | |
|---|---|---|
| WO | 2017/142694 A1 | 8/2017 |
| WO | 2019/023045 A1 | 1/2019 |

OTHER PUBLICATIONS

Wikipedia, https://en.wikipedia.org/wiki/Crowdsourcing, date accessed Sep. 28, 2016, 25 pages.

(Continued)

*Primary Examiner* — Oleg Korsak
(74) *Attorney, Agent, or Firm* — Goodwin Procter LLP (57) ABSTRACT

A computer-implemented method is provided for external detection of a vulnerable system coupled to a communication network. The method can include measuring communication traffic on the communication network to identify one or more domain names, which in turn can originate from server systems in the communication network. The method can further include identifying the domain names based on metadata from the domain names and/or the measured communication traffic, where each domain name has an associated property indicative of its vulnerability. The method can further include determining whether any one (or more) of the domain names is registered at a domain name registry and, if the domain name is not registered, registering the domain name.

19 Claims, 4 Drawing Sheets

(56) References Cited

U.S. PATENT DOCUMENTS

| | | | |
|---|---|---|---|
| D630,645 S | 1/2011 | Tokunaga et al. |
| 7,971,252 B2 | 6/2011 | Lippmann et al. |
| D652,048 S | 1/2012 | Joseph |
| D667,022 S | 9/2012 | LoBosco et al. |
| 8,370,933 B1 | 2/2013 | Buckler |
| 8,429,630 B2 | 4/2013 | Nickolov et al. |
| D682,287 S | 5/2013 | Cong et al. |
| D688,260 S | 8/2013 | Pearcy et al. |
| 8,504,556 B1 | 8/2013 | Rice et al. |
| D691,164 S | 10/2013 | Lim et al. |
| D694,252 S | 11/2013 | Helm |
| D694,253 S | 11/2013 | Helm |
| D700,616 S | 3/2014 | Chao |
| 8,677,481 B1 | 3/2014 | Lee |
| 8,825,662 B1 | 9/2014 | Kingman et al. |
| D730,918 S | 6/2015 | Park et al. |
| 9,053,210 B2 | 6/2015 | Elnikety et al. |
| D740,847 S | 10/2015 | Yampolskiy et al. |
| D740,848 S | 10/2015 | Bolts et al. |
| D741,351 S | 10/2015 | Kito et al. |
| D746,832 S | 1/2016 | Pearcy et al. |
| 9,244,899 B1 | 1/2016 | Greenbaum |
| 9,294,498 B1 | 3/2016 | Yampolskiy et al. |
| D754,690 S | 4/2016 | Park et al. |
| D754,696 S | 4/2016 | Follett et al. |
| D756,371 S | 5/2016 | Bertnick et al. |
| D756,372 S | 5/2016 | Bertnick et al. |
| D756,392 S | 5/2016 | Yun et al. |
| D759,084 S | 6/2016 | Yampolskiy et al. |
| D759,689 S | 6/2016 | Olson et al. |
| 9,372,994 B1 | 6/2016 | Yampolskiy et al. |
| D760,782 S | 7/2016 | Kendler et al. |
| 9,384,206 B1 | 7/2016 | Bono et al. |
| 9,407,658 B1 | 8/2016 | Kuskov et al. |
| 9,424,333 B1 | 8/2016 | Bisignani et al. |
| D771,695 S | 11/2016 | Yampolskiy et al. |
| D772,276 S | 11/2016 | Yampolskiy et al. |
| 9,501,647 B2 | 11/2016 | Yampolskiy et al. |
| D773,507 S | 12/2016 | Sagrillo et al. |
| D775,635 S | 1/2017 | Raji et al. |
| D776,136 S | 1/2017 | Chen et al. |
| D776,153 S | 1/2017 | Yampolskiy et al. |
| D777,177 S | 1/2017 | Chen et al. |
| 9,560,072 B1 * | 1/2017 | Xu ................ H04L 63/1416 |
| D778,927 S | 2/2017 | Bertnick et al. |
| D778,928 S | 2/2017 | Bertnick et al. |
| D779,512 S | 2/2017 | Kimura et al. |
| D779,514 S | 2/2017 | Baris et al. |
| D779,531 S | 2/2017 | List et al. |
| D780,770 S | 3/2017 | Sum et al. |
| D785,009 S | 4/2017 | Lim et al. |
| D785,010 S | 4/2017 | Bachman et al. |
| D785,016 S | 4/2017 | Berwick et al. |
| 9,620,079 B2 | 4/2017 | Curtis |
| D787,530 S | 5/2017 | Huang |
| D788,128 S | 5/2017 | Wada |
| 9,641,547 B2 | 5/2017 | Yampolskiy et al. |
| 9,646,110 B2 | 5/2017 | Byrne et al. |
| D789,947 S | 6/2017 | Sun |
| D789,957 S | 6/2017 | Wu et al. |
| D791,153 S | 7/2017 | Rice et al. |
| D791,834 S | 7/2017 | Eze et al. |
| D792,427 S | 7/2017 | Weaver et al. |
| D795,891 S | 8/2017 | Kohan et al. |
| D796,523 S | 9/2017 | Bhandari et al. |
| D801,989 S | 11/2017 | Iketsuki et al. |
| D803,237 S | 11/2017 | Wu et al. |
| D804,528 S | 12/2017 | Martin et al. |
| D806,735 S | 1/2018 | Olsen et al. |
| D806,737 S | 1/2018 | Chung et al. |
| D809,523 S | 2/2018 | Lipka et al. |
| D812,633 S | 3/2018 | Saneii |
| D814,483 S | 4/2018 | Gavaskar et al. |
| D815,119 S | 4/2018 | Chalker et al. |
| D815,148 S | 4/2018 | Martin et al. |
| D816,105 S | 4/2018 | Rudick et al. |
| D816,116 S | 4/2018 | Selassie |
| 9,954,893 B1 | 4/2018 | Zhao et al. |
| D817,970 S | 5/2018 | Chang et al. |
| D817,977 S | 5/2018 | Kato et al. |
| D819,687 S | 6/2018 | Yampolskiy et al. |
| 10,044,750 B2 | 8/2018 | Livshits et al. |
| 10,142,364 B2 | 11/2018 | Baukes et al. |
| 10,185,924 B1 | 1/2019 | McClintock et al. |
| 10,217,071 B2 | 2/2019 | Mo et al. |
| 10,230,753 B2 | 3/2019 | Yampolskiy et al. |
| 10,230,764 B2 | 3/2019 | Ng et al. |
| 10,257,219 B1 | 4/2019 | Geil et al. |
| 10,339,321 B2 | 7/2019 | Tedeschi |
| 10,339,484 B2 | 7/2019 | Pai et al. |
| 2001/0044798 A1 | 11/2001 | Nagral et al. |
| 2002/0083077 A1 | 6/2002 | Vardi |
| 2002/0133365 A1 | 9/2002 | Grey et al. |
| 2002/0164983 A1 | 11/2002 | Raviv et al. |
| 2003/0050862 A1 | 3/2003 | Bleicken et al. |
| 2003/0123424 A1 | 7/2003 | Jung |
| 2003/0187967 A1 | 10/2003 | Walsh et al. |
| 2004/0003284 A1 | 1/2004 | Campbell et al. |
| 2004/0010709 A1 | 1/2004 | Baudoin et al. |
| 2004/0024859 A1 | 2/2004 | Bloch et al. |
| 2004/0098375 A1 | 5/2004 | DeCarlo |
| 2004/0133561 A1 | 7/2004 | Burke |
| 2004/0193907 A1 | 9/2004 | Patanella |
| 2004/0193918 A1 | 9/2004 | Green et al. |
| 2004/0199791 A1 | 10/2004 | Poletto et al. |
| 2004/0199792 A1 | 10/2004 | Tan et al. |
| 2004/0221296 A1 | 11/2004 | Ogielski et al. |
| 2004/0250122 A1 | 12/2004 | Newton |
| 2004/0250134 A1 | 12/2004 | Kohler et al. |
| 2005/0071450 A1 | 3/2005 | Allen et al. |
| 2005/0076245 A1 | 4/2005 | Graham et al. |
| 2005/0080720 A1 | 4/2005 | Betz et al. |
| 2005/0108415 A1 | 5/2005 | Turk et al. |
| 2005/0131830 A1 | 6/2005 | Juarez et al. |
| 2005/0138413 A1 | 6/2005 | Lippmann et al. |
| 2005/0160002 A1 | 7/2005 | Roetter et al. |
| 2005/0278726 A1 | 12/2005 | Cano et al. |
| 2006/0036335 A1 | 2/2006 | Banter et al. |
| 2006/0107226 A1 | 5/2006 | Matthews et al. |
| 2006/0173992 A1 | 8/2006 | Weber et al. |
| 2006/0212925 A1 | 9/2006 | Shull et al. |
| 2006/0253581 A1 | 11/2006 | Dixon et al. |
| 2007/0067845 A1 | 3/2007 | Wiemer et al. |
| 2007/0143851 A1 | 6/2007 | Nicodemus et al. |
| 2007/0198275 A1 | 8/2007 | Malden et al. |
| 2007/0282730 A1 | 12/2007 | Carpenter et al. |
| 2008/0033775 A1 | 2/2008 | Dawson et al. |
| 2008/0047018 A1 | 2/2008 | Baudoin et al. |
| 2008/0091834 A1 | 4/2008 | Norton |
| 2008/0140495 A1 | 6/2008 | Bhamidipaty et al. |
| 2008/0162931 A1 | 7/2008 | Lord et al. |
| 2008/0172382 A1 | 7/2008 | Prettejohn |
| 2008/0208995 A1 | 8/2008 | Takahashi et al. |
| 2008/0209565 A2 | 8/2008 | Baudoin et al. |
| 2008/0222287 A1 | 9/2008 | Bahl et al. |
| 2008/0262895 A1 | 10/2008 | Hofmeister et al. |
| 2009/0044272 A1 | 2/2009 | Jarrett |
| 2009/0094265 A1 | 4/2009 | Vlachos et al. |
| 2009/0125427 A1 | 5/2009 | Atwood et al. |
| 2009/0132861 A1 | 5/2009 | Costa et al. |
| 2009/0161629 A1 | 6/2009 | Purkayastha et al. |
| 2009/0193054 A1 | 7/2009 | Karimisetty et al. |
| 2009/0216700 A1 | 8/2009 | Bouchard et al. |
| 2009/0265787 A9 | 10/2009 | Baudoin et al. |
| 2009/0293128 A1 | 11/2009 | Lippmann et al. |
| 2009/0299802 A1 | 12/2009 | Brennan |
| 2009/0300768 A1 | 12/2009 | Krishnamurthy et al. |
| 2009/0319420 A1 | 12/2009 | Sanchez et al. |
| 2009/0328063 A1 | 12/2009 | Corvera et al. |
| 2010/0017880 A1 | 1/2010 | Masood |
| 2010/0042605 A1 | 2/2010 | Cheng et al. |
| 2010/0057582 A1 | 3/2010 | Arlin et al. |
| 2010/0205042 A1 | 8/2010 | Mun |
| 2010/0218256 A1 | 8/2010 | Thomas et al. |

(56) References Cited

U.S. PATENT DOCUMENTS

| | | |
|---|---|---|
| 2010/0262444 A1 | 10/2010 | Atwal et al. |
| 2010/0275263 A1 | 10/2010 | Bennett et al. |
| 2010/0281124 A1 | 11/2010 | Westman et al. |
| 2010/0281151 A1 | 11/2010 | Ramankutty et al. |
| 2011/0137704 A1 | 6/2011 | Mitra et al. |
| 2011/0145576 A1 | 6/2011 | Bettan |
| 2011/0185403 A1 | 7/2011 | Dolan et al. |
| 2011/0231395 A1 | 9/2011 | Vadlamani et al. |
| 2011/0239300 A1 | 9/2011 | Klein et al. |
| 2011/0296519 A1 | 12/2011 | Ide et al. |
| 2012/0036263 A1 | 2/2012 | Madden et al. |
| 2012/0089745 A1 | 4/2012 | Turakhia |
| 2012/0158725 A1 | 6/2012 | Molloy et al. |
| 2012/0166458 A1 | 6/2012 | Laudanski et al. |
| 2012/0215892 A1 | 8/2012 | Wanser et al. |
| 2012/0255027 A1 | 10/2012 | Kanakapura et al. |
| 2012/0291129 A1 | 11/2012 | Shulman et al. |
| 2013/0014253 A1 | 1/2013 | Neou et al. |
| 2013/0060351 A1 | 3/2013 | Imming et al. |
| 2013/0080505 A1 | 3/2013 | Nielsen et al. |
| 2013/0086521 A1 | 4/2013 | Grossele et al. |
| 2013/0091574 A1 | 4/2013 | Howes et al. |
| 2013/0124644 A1 | 5/2013 | Hunt et al. |
| 2013/0124653 A1 | 5/2013 | Vick et al. |
| 2013/0173791 A1 | 7/2013 | Longo |
| 2013/0291105 A1 | 10/2013 | Yan |
| 2013/0298244 A1 | 11/2013 | Kumar et al. |
| 2013/0305368 A1 | 11/2013 | Ford |
| 2013/0333038 A1 | 12/2013 | Chien |
| 2013/0347116 A1 | 12/2013 | Flores et al. |
| 2014/0019196 A1 | 1/2014 | Wiggins et al. |
| 2014/0108474 A1 | 4/2014 | David et al. |
| 2014/0130158 A1 | 5/2014 | Wang et al. |
| 2014/0146370 A1 | 5/2014 | Banner et al. |
| 2014/0189098 A1 | 7/2014 | MaGill et al. |
| 2014/0204803 A1 | 7/2014 | Nguyen et al. |
| 2014/0244317 A1 | 8/2014 | Roberts et al. |
| 2014/0283068 A1 | 9/2014 | Call et al. |
| 2014/0288996 A1 | 9/2014 | Rence et al. |
| 2015/0033341 A1 | 1/2015 | Schmidtler et al. |
| 2015/0074579 A1 | 3/2015 | Gladstone et al. |
| 2015/0180883 A1 | 6/2015 | Aktas et al. |
| 2015/0261955 A1 | 9/2015 | Huang et al. |
| 2015/0288706 A1 | 10/2015 | Marshall |
| 2015/0310188 A1 | 10/2015 | Ford et al. |
| 2015/0310213 A1 | 10/2015 | Ronen et al. |
| 2015/0350229 A1 | 12/2015 | Mitchell |
| 2015/0381649 A1 | 12/2015 | Schultz et al. |
| 2016/0065613 A1 | 3/2016 | Cho et al. |
| 2016/0140466 A1 | 5/2016 | Sidebottom et al. |
| 2016/0147992 A1 | 5/2016 | Zhao et al. |
| 2016/0171415 A1 | 6/2016 | Yampolskiy et al. |
| 2016/0173522 A1 | 6/2016 | Yampolskiy et al. |
| 2016/0189301 A1 | 6/2016 | Ng et al. |
| 2016/0205126 A1 | 7/2016 | Boyer et al. |
| 2016/0248797 A1 | 8/2016 | Yampolskiy et al. |
| 2016/0253500 A1 | 9/2016 | Alme et al. |
| 2016/0259945 A1 | 9/2016 | Yampolskiy et al. |
| 2016/0337387 A1 | 11/2016 | Hu et al. |
| 2016/0344801 A1 | 11/2016 | Akkarawittayapoom |
| 2017/0048267 A1 | 2/2017 | Yampolskiy et al. |
| 2017/0063901 A1 | 3/2017 | Muddu et al. |
| 2017/0161409 A1 | 6/2017 | Martin |
| 2017/0236078 A1 | 8/2017 | Rasumov |
| 2017/0237764 A1 | 8/2017 | Rasumov |
| 2017/0279843 A1 | 9/2017 | Schultz et al. |
| 2017/0316324 A1 | 11/2017 | Barrett et al. |
| 2017/0324766 A1 | 11/2017 | Gonzalez Granadillo et al. |
| 2018/0013716 A1* | 1/2018 | Connell .............. H04L 61/1511 |
| 2018/0103043 A1 | 4/2018 | Kupreev et al. |
| 2018/0124110 A1 | 5/2018 | Hunt et al. |
| 2018/0139180 A1 | 5/2018 | Napchi et al. |
| 2018/0157468 A1 | 6/2018 | Stachura |
| 2018/0337938 A1 | 11/2018 | Kneib et al. |
| 2018/0337941 A1 | 11/2018 | Kraning et al. |
| 2018/0365519 A1 | 12/2018 | Pollard et al. |
| 2019/0034845 A1 | 1/2019 | Mo et al. |
| 2019/0140925 A1 | 5/2019 | Pon et al. |
| 2019/0147378 A1 | 5/2019 | Mo et al. |

OTHER PUBLICATIONS

Williams, Leevar, et al., "An Interactive Attack Graph Cascade and Reachability Display," MIT Lincoln Laboratory, 17 pages.

Williams, Leevar, et al., "GARNET: A Graphical Attack Graph and Reachability Network Evaluation Tool," MIT Lincoln Library, VizSEC 2009, pp. 44-59.

Jin et al, "Identifying and tracking suspicious activities through IP gray space analysis", MineNet, Jun. 12, 2007, 6 pages.

Johnson, Eric, et al., "Information Risk and the Evolution of the Security Rating Industry," Mar. 24, 2009, 27 pages.

Joslyn, et al., "Massive Scale Cyber Traffic Analysis: A Driver for Graph Database Research," Proceedings of the First International Workshop on Graph Data Management Experience and Systems (GRADES 2013), 6 pages.

Kc Claffy, "Internet measurement and data analysis: topology, workload, performance and routing statistics," accessed on the Internet at http://www.caida.org/publications/papers/1999/Nae/Nae.html., NAE '99 workshop, 1999, 22 pages.

Li et al., "Finding the Linchpins of the Dark Web: a Study on Topologically Dedicated Hosts on Malicious Web Infrastructures", IEEE, 2013, 15 pages.

Lippmann, Rich, et al., NetSPA: a Network Security Planning Architecture, MIT Lincoln Laboratory, 11 pages.

Lippmann, Richard, et al., "Validating and Restoring Defense in Depth Using Attack Graphs," MIT Lincoln Laboratory, 10 pages.

Lippmann, RP., et al., "An Annotated Review of Papers on Attack Graphs," Project Report IA-1, Lincoln Laboratory, Massachusetts Institute of Technology, Mar. 31, 2005, 39 pages.

Lippmann, RP., et al., "Evaluating and Strengthening Enterprise Network Security Using Attack Graphs," Project Report IA-2, MIT Lincoln Laboratory, Oct. 5, 2005, 96 pages.

Maltego XL, accessed on the Internet at https://www.paterva.com/web7/buy/maltego-clients/maltego-xl.php, 5 pages.

Massimo Candela, "Real-time BGP Visualisation with BGPlay," accessed on the Internet at https://labs.ripe.net/Members/massimo_candelaireal-time-bgp-visualisation- with-bgplay), Sep. 30, 2015, 8 pages.

MaxMind, https://www.maxmind.com/en/about-maxmind,https://www.maxmind.com/en/geoip2-isp-database, date accessed Sep. 28, 20116, 3 pages.

MCNAB, "Network Security Assessment," copyright 2004, 55 pages.

Method Documentation, CNSS Risk Assessment Tool Version 1.1, Mar. 31, 2009, 24 pages.

Moradi, et al., "Quantitative Models for Supply Chain Management," IGI Global, 2012, 29 pages.

Netcraft, www.netcraft.com, date accessed Sep. 28, 2016, 2 pages.

NetScanTools Pro, http://www.netscantools.com/nstpromain.html, date accessed Sep. 28, 2016, 2 pages.

Network Security Assessment, C. McNab, copyright 2004, 13 pages.

Noel, et al., "Big-Data Architecture for Cyber Attack Graphs, Representing Security Relationships in NoSQL Graph Databases," The MITRE Corporation, 2014, 6 pages.

Nye, John, "Avoiding Audit Overlap," Moody's Risk Services, Presentation, Source Boston, Mar. 14, 2008, 19 pages.

Pending claims for U.S. Appl. No. 14/021,585, filed Apr. 29, 2016, 2 pages.

Pending claims for U.S. Appl. No. 14/021,585, filed Nov. 18, 2015, 6 pages.

U.S. Appl. No. 13/240,572 and pending claims, filed Mar. 22, 2016, 10 pages.

U.S. Appl. No. 13/240,572, filed Oct. 7, 2015, application as filed and pending claims, 45 pages.

U.S. Appl. No. 14/021,585 and pending claims, filed Mar. 22, 2016, 2 pages.

(56) References Cited

OTHER PUBLICATIONS

U.S. Appl. No. 14/021,585, filed Oct. 7, 2015 and application as filed, 70 pages.
U.S. Appl. No. 14/944,484 and pending claims, filed Mar. 22, 2016, 4 pages.
U.S. Appl. No. 61/386,156, filed Oct. 7, 2015, 2 pages.
U.S. Appl. No. 13/240,572, filed Apr. 29, 2016, 46 pages.
U.S. Appl. No. 14/944,484, filed Apr. 29, 2016, 4 pages.
Paxson, Vern, "Flow the Pursuit of Truth Led Me to Selling Viagra," EECS Department, University of California, International Computer Science Institute, Lawrence Berkeley National Laboratory, Aug. 13, 2009, 68 pages.
Proposal and Award Policies and Procedures Guide, Part I—Proposal Preparation & Submission Guidelines GPG, The National Science Foundation, Feb. 2009, 68 pages.
Provos et al., "The Ghost in the Browser Analysis of Web-based Malware", 2007, 9 pages.
Rare Events, Oct. 2009, Jason, The MITRE Corporation, Oct. 2009, 104 pages.
Report to the Congress on Credit Scoring and Its Effects on the Availability and Affordability of Credit, Board of Governors of the Federal Reserve System, Aug. 2007, 304 pages.
RFC 1834, https://tools.ietf.org/html/rfc1834, date accessed Sep. 28, 2016, 7 pages.
RFC 781, https://tools.ietf.org/html/rfc781, date accessed Sep. 28, 2016, 3 pages.
RFC 950, https://tools.ietf.org/html/rfc950, date accessed Sep. 28, 2016, 19 pages.
RFC 954, https://tools.ietf.org/html/rfc954, date accessed Sep. 28, 2016, 5 pages.
SamSpade Network Inquiry Utility, https://www.sans.org/reading-room/whitepapers/tools/sam-spade-934, date accessed Sep. 28, 2016, 19 pages.
SBIR Phase I: Enterprise Cyber Security Scoring, CyberAnalytix, LLC, http://www.nsf.gov/awardsearch/showAward.do?AwardNumber=I013603, Apr. 28, 2010, 2 pages.
Security Warrior, Cyrus Peikari, Anton, Chapter 8: Reconnaissance, 6 pages.
Snort Intrusion Monitoring System, http://archive.oreilly.com/pub/h/1393, date accessed Sep. 28, 2016, 3 pages.
Srivastava, Divesh; Velegrakis, Yannis. Using Queries to Associate Metadata with Data. IEEE 23rd International Conference on Data Engineering. Pub. Date: 2007. http://ieeexplore.ieee.org/stamp/stamp.jsp?arnumber=4221823, 3 pages.
Stone-Gross, Brett, et al., "FIRE: Finding Rogue Networks," 10 pages.
Taleb, Nassim N., et al., "The Six Mistakes Executives Make in Risk Management," Harvard Business Review, Oct. 2009, 5 pages.
The CIS Security Metrics v1.0.0, The Center for Internet Security, May 11, 2009, 90 pages.
The Fair Credit Reporting Act (FCRA) of the Federal Trade Commission (FTC), Jul. 30, 2004, 86 pages.
The Financial Institution Shared Assessments Program, Industry Positioning and Mapping Document, BITS, Oct. 2007, 44 pages.
Wagner, et al., "Assessing the vulnerability of supply chains using graph theory" Int. J. Production Economics 126 (2010) 121-129.
U.S. Appl. No. 15/377,574 U.S. Pat. No. 9,705,932, Methods and Systems for Creating, De-Duplicating, and Accessing Data Using an Object Storage System, filed Dec. 13, 2016.
U.S. Appl. No. 14/021,585 U.S. Pat. No. 9,438,615 Published as: US2015/0074579, Security Risk Management, filed Sep. 9, 2013.
U.S. Appl. No. 15/216,955 Published as: US2016/0330231, Methods for Using Organizational Behavior for Risk Ratings, filed Jul. 22, 2016.
U.S. Appl. No. 15/239,063 Published as: US2017/0093901, Security Risk Management, filed Aug. 17, 2016.
U.S. Appl. No. 16/405,121, Methods for Using Organizational Behavior for Risk Ratings, filed May 7, 2019.
U.S. Appl. No. 13/240,572 Published as: US2016/0205126, Information Technology Security Assessment System, filed Sep. 22, 2011.
U.S. Appl. No. 14/944,484 U.S. Pat. No. 9,973,524 Published as: US2016/0323308, Information Technology Security Assessment System, filed Nov. 18, 2015.
U.S. Appl. No. 15/142,677 U.S. Pat. No. 9,830,569 Published as: US/2016/0239772, Security Assessment Using Service Provider Digital Asset Information, filed Apr. 29, 2016.
U.S. Appl. No. 15/134,845 U.S. Pat. No. 9,680,858, Annotation Platform For a Security Risk System, filed Apr. 21, 2016.
U.S. Appl. No. 15/044,952 Published as: US2017/0236077, Relationships Among Technology Assets and Services and the Entities Responsible for Them, filed Feb. 16, 2016.
U.S. Appl. No. 15/089,375 U.S. Pat. No. 10,176,445, Relationships Among Technology Assets and Services and the Entities, filed Apr. 1, 2016, Published as: US2017/0236079, Reponsible For Them.
U.S. Appl. No. 29/598,298 U.S. Pat. No. D835,631, Computer Display Screen With Graphical User Interface, filed Mar. 24, 2017.
U.S. Appl. No. 29/598,299 U.S. Pat. No. D818,475, Computer Display With Security Ratings Graphical User Interface, filed Mar. 24, 2017.
U.S. Appl. No. 29/599,622 U.S. Pat. No. D847,169, Computer Display With Security Ratings Graphical User Interface, filed Apr. 5, 2017.
U.S. Appl. No. 29/599,620 U.S. Pat. No. D846,562, Computer Display With Security Ratings Graphical User Inferface, filed Apr. 5, 2017.
U.S. Appl. No. 16/015,686, Methods For Mapping IP Addresses and Domains to Organizations Using User Activity Data, filed Jun. 22, 2018.
U.S. Appl. No. 16/543,075, Methods For Mapping IP Addresses and Domains To Organizations Using User Activity Data, filed Aug. 16, 2019.
U.S. Appl. No. 15/918,286 U.S. Pat. No. 10,257,219, Correlated Risk in Cybersecurity, filed Mar. 12, 2018.
U.S. Appl. No. 16/292,956, Correlated Risk in Cybersecurity, filed Mar. 5, 2019.
U.S. Appl. No. 16/170,680, Systems and Methods for Remote Detection of Software Through Browser Webinjects, filed Oct. 25, 2018.
U.S. Appl. No. 29/666,942, Computer Display With Forecast Graphical User Interface, filed Oct. 17, 2018.
U.S. Appl. No. 16/360,641, Systems and Methods for Forecasting Cybersecurity Ratings Based on Event-Rate Scenarios, filed Mar. 21, 2019.
U.S. Appl. No. 16/514,771, Systems and Methods for Generating Security Improvement Plans for Entities, filed Jul. 17, 2019.
U.S. Appl. No. 29/677,306, Computer Display With Corporate Hierarchy Graphical User Interface, filed Jan. 18, 2019.
U.S. Appl. No. 15/377,574, now U.S. Pat. No. 9,705,932, the Office Action dated Mar. 2, 2017 and Notice of Allowance dated Jun. 1, 2017.
U.S. Appl. No. 14/021,585, now U.S. Pat. No. 9,438,615, the Office Action dated Mar. 11, 2016 and the Notice of Allowance dated Aug. 9, 2016.
U.S. Appl. No. 15/216,955, the Office Actions dated Nov. 4, 2016, Mar. 9, 2017, Jun. 6, 2017, Dec. 5, 2017, and Aug. 29, 2018, and the Notice of Allowance dated Feb. 6, 2019.
U.S. Appl. No. 15/239,063, the Office Action dated Mar. 21, 2018 and the Notice of Allowance dated Jan. 14, 2019.
U.S. Appl. No. 16/405,121, the Office Action dated Aug. 1, 2019.
U.S. Appl. No. 13/240,572, the Office Actions dated May 7, 2013, Nov. 21, 2013, Jun. 16, 2014, Feb. 27, 2015, Jun. 3, 2015, Oct. 26, 2015, Mar. 10, 2016, Feb. 13, 2017, and Examiner's Answer to Appeal Brief dated May 16, 2018.
U.S. Appl. No. 14/944,484, now U.S. Pat. No.9,973,524, the Office Actions dated Mar. 11, 2016, Jul. 5, 2016, and Jan. 17, 2017 and the Notice of Allowance dated Oct. 20, 2017.
U.S. Appl. No. 15/142,677, now U.S. Pat. No.9,830,569, the Office Actions dated Jul. 26, 2016, and Apr. 24, 2017 and the Notice of Allowance dated Oct. 11, 2017.

(56) References Cited

OTHER PUBLICATIONS

U.S. Appl. No. 15/134,845, now U.S. Pat. No.9,680,858, the Office Actions dated Jul. 19, 2016 and Jan. 26, 2017, and the Notices of Allowance dated Apr. 27, 2017 and May 9, 2017.
U.S. Appl. No. 15/044,952, the Office Action dated Jul. 8, 2019.
U.S. Appl. No. 15/089,375, now U.S. Pat. No. 10,176,445, the Office Actions dated Sep. 9, 2016, May 17, 2017, and Nov. 17, 2017 and the Notice of Allowance dated Aug. 9, 2018.
U.S. Appl. No. 29/598,298, now U.S. Pat. No. D835,631, the Notice of Allowance dated Aug. 15, 2018.
U.S. Appl. No. 29/598,299, now U.S. Pat. No. D818,475, the Notice of Allowance dated Jan. 2, 2018.
U.S. Appl. No. 29/599,622, now U.S. Pat. No. D847,169, the Notice of Allowance dated Dec. 11, 2018.
U.S. Appl. No. 29/599,620, now U.S. Pat. No. D846,562, the Notice of Allowance dated Nov. 27, 2018.
U.S. Appl. No. 16/015,686, the Office Action dated Nov. 16, 2018 and the Notice of Allowance dated May 10, 2019.
U.S. Appl. No. 15/918,286, the Office Action dated Aug. 7, 2018 and the Notice of Allowance dated Nov. 29, 2018.
U.S. Appl. No. 16/292,956, the Office Action dated Jul. 10, 2019.
U.S. Appl. No. 16/170,680, the Office Action dated Mar. 26, 2019.
U.S. Appl. No. 16/360,641, the Office Action dated Aug. 7, 2019.
"About Neo4j," 1 page.
"Agreed Upon Procedures," Version 4.0, BITS, The Financial Institution Shared Assessments Program, Assessment Guide, Sep. 2008, 56 pages.
"Amazon Mechanical Turk," accessed on the Internet at https://www.mturk.com/; 7 pages.
"An Executive View ofIT Governance," IT Governance Institute, 2009, 32 pages.
"Assessing Risk in Turbulent Times," A Workshop for Information Security Executives, Glassmeyter/McNamee Center for Digital Strategies, Tuck School of Business at Dartmouth, Institute for Information Infrastructure Protection, 2009, 17 pages.
"Assuring a Trusted and Resilient Information and Communications Infrastructure," Cyberspace Policy Review, May, 2009, 76 pages.
"Computer Network Graph," http://www.opte.org; 1 page.
"Creating Transparency with Palantir," accessed on the internet at https://www.youtube.com/watch?v=8cbGChfagUA; Jul. 5, 2012; 1 page.
"Gephi (gephi.org)," accessed on the internet at https://web.archive.org/web/20151216223216/https://gephi.org/; Dec. 16, 2015; 1 page.
"Master Security Criteria," Version 3.0, BITS Financial Services Security Laboratory, Oct. 2001, 47 pages.
"mile 2 CPTE Maltego Demo," accessed on the internet at https://www.youtube.com/watch?v=o2oNKOUzP0U; Jan. 12, 2012; 1 page.
"Neo4j (neo4j.com)," accessed on the internet at https://web.archive.org/web/20151220150341/http://neo4j.com:80/developer/ guide-data-visualization/; Dec. 20, 2015; 1 page.
"Palantir Cyber: Uncovering malicious behavior at petabyte scale," accessed on the internet at https://www.youtube.com/watch?v=_EhYezVO6EE; Dec. 21, 2012; 1 page.
"Palantir.com," accessed on the internet at http://www.palantir.com/; Dec. 2015; 2 pages.
Gilgur, et al., "Percentile-Based Approach to Forecasting Workload Growth" Proceedings of CMG'15 Performance and Capacity International Conference by the Computer Measurement Group. No. 2015 (Year:2015).
"Plugging the Right Holes," Lab Notes, MIT Lincoln Library, Posted Jul. 2008, retrieved Sep. 14, 2010 from http://www.11.miLedufpublicationsflabnotesfpluggingtherightho! . . . , 2 pages.
"Rapid7 Nexpose Vulnerability Scanner," accessed on the internet at https://www.rapid7.com/products/nexpose/download/, 5 pages.
"Report on Controls Placed in Operation and Test of Operating Effectiveness," EasCorp, Jan. 1 through Dec. 31, 2008, prepared by Crowe Horwath, 58 pages.
"Shared Assessments: Getting Started," BITS, 2008, 4 pages.
"Tenable Nessus Network Vulnerability Scanner," accessed on the internet at https://www.tenable.com/products/nessus/nessus-professional; 13 pages.
"Twenty Critical Controls for Effective Cyber Defense: Consensus Audit," Version 2.3, Nov. 13, 2009, retrieved on Apr. 9, 2010 from http://www.sans.org/critical-security-controls/print.php., 52 pages.
2009 Data Breach Investigations Report, study conducted by Verizon Business Risk Team, 52 pages.
Application as filed, U.S. Appl. No. 13/240,572, filed Nov. 18, 2015, 45 pages
Artz, Michael Lyle, "NetSPA: A Network Security Planning Architecture," Massachusetts Institute of Technology, May 24, 2002, 97 pages.
Bhilare et al., "Protecting Intellectual Property and Sensitive Information in Academic Campuses from Trusted Insiders: Leveraging Active Directory", SIGUCC, Oct. 2009, 5 pages.
BitSight, "Cyber Security Myths Versus Reality: How Optimism Bias Contributes to Inaccurate Perceptions of Risk", Jun. 2015, Dimensional Research, pp. 1-9.
Borgatti, et al., "On Social Network Analysis in a Supply Chain Context," Journal of Supply Chain Management; 45(2): 5-22; Apr. 2009, 18 pages.
Boyer, Stephen, et al., Playing with Blocks: SCAP-Enable Higher-Level Analyses, MIT Lincoln Laboratory, 5th Annual IT Security Automation Conference, Oct. 26-29, 2009, 35 pages.
Browne, Niall, et al., "Shared Assessments Program AUP and SAS70 Frequently Asked Questions," BITS, 4 pages.
Buckshaw, Donald L., "Use of Decision Support Techniques for Information System Risk Management," submitted for publication in Wiley's Encyclopedia of Quantitative Risk Assessment in Jan. 2007, 11 pages.
Buehler, Kevin S., et al., "Running with risk," The McKinsey Quarterly, No. 4, 2003, pp. 40-49.
Carstens, et al., "Modeling Company Risk and Importance in Supply Graphs," European Semantic Web Conference 2017: The Semantic Web pp. 18-31.
Chu, Matthew, et al. "Visualizing Attack Graphs, Reachability, and Trust Relationships with Navigator," MIT Lincoln Library, VizSEC '10, Ontario, Canada, Sep. 14, 2010, 12 pages.
Chuvakin, "SIEM: Moving beyond compliance", RSA White Paper, 2010, 16 pages.
Computer Network Graph-Bees, http://bioteams.com/2007/04/30/visualizing_complex_networks.html, date accessed Sep. 28, 2016, 2 pages.
Computer Network Graph-Univ. of Michigan, http://people.cst.cmich.edu/liao1q/research.shtml, date accessed Sep. 28, 2016, 5 pages.
Crowther, Kenneth G., et al., "Principles for Better Information Security through More Accurate, Transparent Risk Scoring," Journal of Homeland Security and Emergency Management, vol. 7, Issue 1, Article 37, 2010, 20 pages.
Davis, Lois M., et al., "The National Computer Security Survey (NCSS) Final Methodology," Technical report prepared for the Bureau of Justice Statistics, Safety and Justice Program, RAND Infrastructure, Safety and Environment (ISE), 2008, 91 pages.
Dillon-Merrill, PhD., Robin L, et al., "Logic Trees: Fault, Success, Attack, Event, Probability, and Decision Trees," Wiley Handbook of Science and Technology for Homeland Security, 13 pages.
Dun & Bradstreet Corp. Stock Report, Standard & Poor's, Jun. 6, 2009, 8 pages.
Dun & Bradstreet, The DUNSRight Quality Process: Power Behind Quality Information, 24 pages.
Edmonds, Robert, "ISC Passive DNS Architecture", Internet Systems Consortium, Inc., Mar. 2012, 18 pages.
Equifax Inc. Stock Report, Standard & Poor's, Jun. 6, 2009, 8 pages.
Gundert, Levi, "Big Data in Security—Part III: Graph Analytics," accessed on the Internet at https://blogs.cisco.com/security/big-data-in-security-part-iii-graph-analytics; Cisco Blog, Dec. 2013, 8 pages.
Hachem, Sara; Toninelli, Alessandra; Pathak, Animesh; Issany, Valerie. Policy-Based Access Control in Mobile Social Ecosystems. 2011 IEEE International Symposium on Policies for Distributed Systems and Networks (Policy). Http://ieeexplore.ieee.org/stamp/stamp.jsp?arnumber=5976796, 8 pages.

(56) References Cited

OTHER PUBLICATIONS

Hacking Exposed 6, S. McClure et al., copyright 2009, 37 pages.

Ingols, Kyle, et al., "Modeling Modern Network Attacks and Countermeasures Using Attack Graphs," MIT Lincoln Laboratory, 16 pages.

Ingols, Kyle, et al., "Practical Attack Graph Generation for Network Defense," MIT Lincoln Library, IEEE Computer Society, Proceedings of the 22nd Annual Computer Security Applications Conference (ACSAC'06), 2006, 10 pages.

Ingols, Kyle, et al., "Practical Experiences Using SCAP to Aggregate CND Data," MIT Lincoln Library, Presentation to Vist SCAP Conference, Sep. 24, 2008, 59 pages.

Jean, "Cyber Security: How to use graphs to do an attack analysis," accessed on the internet at https://linkurio.us/blog/cyber-security-use-graphs-attack-analysis/; Aug. 2014, 11 pages.

\* cited by examiner

SYSTEMS AND METHODS FOR EXTERNAL DETECTION OF MISCONFIGURED SYSTEMS

TECHNICAL FIELD

The following disclosure is directed to methods and systems for detecting vulnerable systems, and, more specifically, methods and systems for detecting vulnerable systems based on domain name properties.

BACKGROUND

In an age of increased cybercrime and varied cybersecurity efforts, detecting vulnerabilities before, or within real-time, a security flaw is exploited can be a true business advantage to companies, governments, institutions, and individuals. In many instances, there are benign but misconfigured systems having these security flaws that become targets for parties with nefarious intentions. Every day, seemingly endless types and numbers of malignant actors exploit security flaws for the purpose of theft (both monetary and of data), espionage, frustration (e.g., denial of service attacks and mass spamming), terrorism, and more. However, the resources necessary to get ahead of these potential threats can be astounding and unfeasible.

SUMMARY

Domain names on the Internet can be a specific source of security flaws and, often, speed in detecting exploitation of domain names becomes crucial to overcoming attacks. To track and detect security flaws in real time, or near real time, systems and methods can monitor communication traffic and extract metadata related to the traffic and/or domain names to detect vulnerable systems.

In accordance with an embodiment of the disclosure, a computer-implemented method is provided for external detection of a vulnerable system coupled to a communication network. The method can include measuring communication traffic on the communication network to identify one or more domain names, which in turn can originate from server systems in the communication network. The method can further include identifying the domain names based on metadata from the domain names and/or the measured communication traffic, where each domain name has an associated property indicative of its vulnerability. The method can further include determining whether any one (or more) of the domain names is registered at a domain name registry and, if the domain name is not registered, registering the domain name.

Embodiments of the methods can include one or more of the following features. Domain names having the property indicative of vulnerability can be: (i) an unregistered domain name, (ii) a malfunctioning domain name, (iii) an abandoned domain name, and/or (iv) an algorithm-generated domain name. The vulnerable system can be a malware-infected server system and/or, a misconfigured server system.

In some embodiments, the metadata can include a geographical location associated with each domain name. If so, the registration of the domain name based on the extracted metadata includes registering the domain name based on a high frequency of domain names having a property indicative of vulnerability in a particular geographical location. The method can further include associating the registered domain name with a server system configured to monitor communication traffic to the registered domain name, and, in some instances, detecting the vulnerable system associated with the registered domain name. Measuring communication traffic to each of the plurality of domain names can further include receiving communication traffic data from one or more Internet service providers (ISP), comparing relative magnitude of communication traffic to an expected amount of traffic, and/or measuring a frequency of communication traffic to the domain name.

In accordance with another embodiment of the disclosure, a system including one or more computer systems programmed to perform operations is provided. The operations include measuring communication traffic in the communication network to identify one or more domain names, where the communication traffic originates from server systems in the communication network. The domain names are based on metadata from (i) the domain names and/or (ii) the measured communication traffic, where each domain name has an associated property indicative of its vulnerability. The operations further include determining whether any one (or more) of the domain names is registered at a domain name registry, and if the domain name is not registered, registering the domain name.

Embodiments of the systems can include one or more of the following features. Domain names having the property indicative of vulnerability can be: (i) an unregistered domain name, (ii) a malfunctioning domain name, (iii) an abandoned domain name, and/or (iv) an algorithm-generated domain name. The vulnerable system can be a malware-infected server system and/or, a misconfigured server system.

In some embodiments, the metadata can include a geographical location associated with each domain name. If so, the registration of the domain name based on the extracted metadata includes registering the domain name based on a high frequency of domain names having a property indicative of vulnerability in a particular geographical location. The method can further include associating the registered domain name with a server system configured to monitor communication traffic to the registered domain name, and, in some instances, detecting the vulnerable system associated with the registered domain name. Measuring communication traffic to each of the plurality of domain names can further include receiving communication traffic data from one or more Internet service providers (ISP), comparing relative magnitude of communication traffic to an expected amount of traffic, and/or measuring a frequency of communication traffic to the domain name.

DETAILED DESCRIPTION

Disclosed herein are exemplary embodiments of systems and methods for detecting vulnerable systems in communication networks. These vulnerable systems can include one or more computing systems, one or more server systems, or other networked systems. In many instances, vulnerable systems are associated with domain names on the Internet.

"Domain names," as used herein, may refer to registered or unregistered names, addresses, and/or links to a resource on the Internet.

Some domain names may be associated with vulnerable resources. In some embodiments, an algorithm may generate links to domain names that are not registered or generated in error. For example, an algorithm that links to "google.com" may incorrectly generate links such as "gooooogle.com" or "goggle.com." In another embodiment, an application developer may register a domain name for a legitimate service or business. If the business associated with the domain name closes, and the domain name is abandoned, the domain name may become expired or "dropped" from the registry. If so, the registry may delete the domain name (de-register) and the domain name may become available to another party. In another embodiment, a registered domain name may be associated with a misconfigured system. For example, the misconfigured system may be operating with security flaws that open the system to security risks. In another embodiment, parties acting with nefarious intentions (criminals or criminal groups, malignant state-sponsored actors, etc.) may register domain names for their own purposes (e.g., malware, botnets, etc.). In another embodiment, an anti-virus software program may try to contact domain names repeatedly based on some acquired misinformation. If so, that domain name will have repeat incoming traffic. Examples of detection of botnets is discussed in CONDENSER: A Graph Based Approach for Detecting Botnets, by Camelo et al., and in Botnet Cluster Identification (Master Thesis), by Pedro Camelo, each of which are incorporated herein by reference.

The below described exemplary systems and methods are configured to identify such domain names, and in some embodiments, identify one or more vulnerable systems associated with such domain names. For the purpose of clarity and conciseness, the methods and systems of FIGS. 1A-3 are discussed below together.

Detection Systems and Methods

Figure 1A:
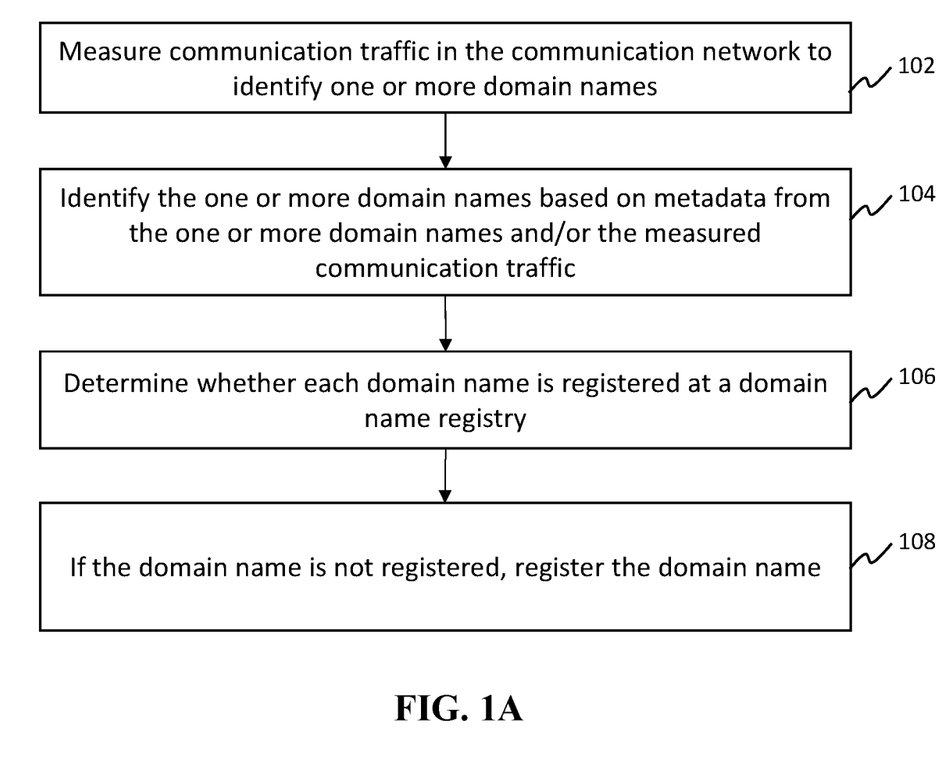
FIGS. 1A-1B are flowcharts of exemplary embodiments of methods for detecting vulnerable systems coupled to a communication network.
Figure 1B:
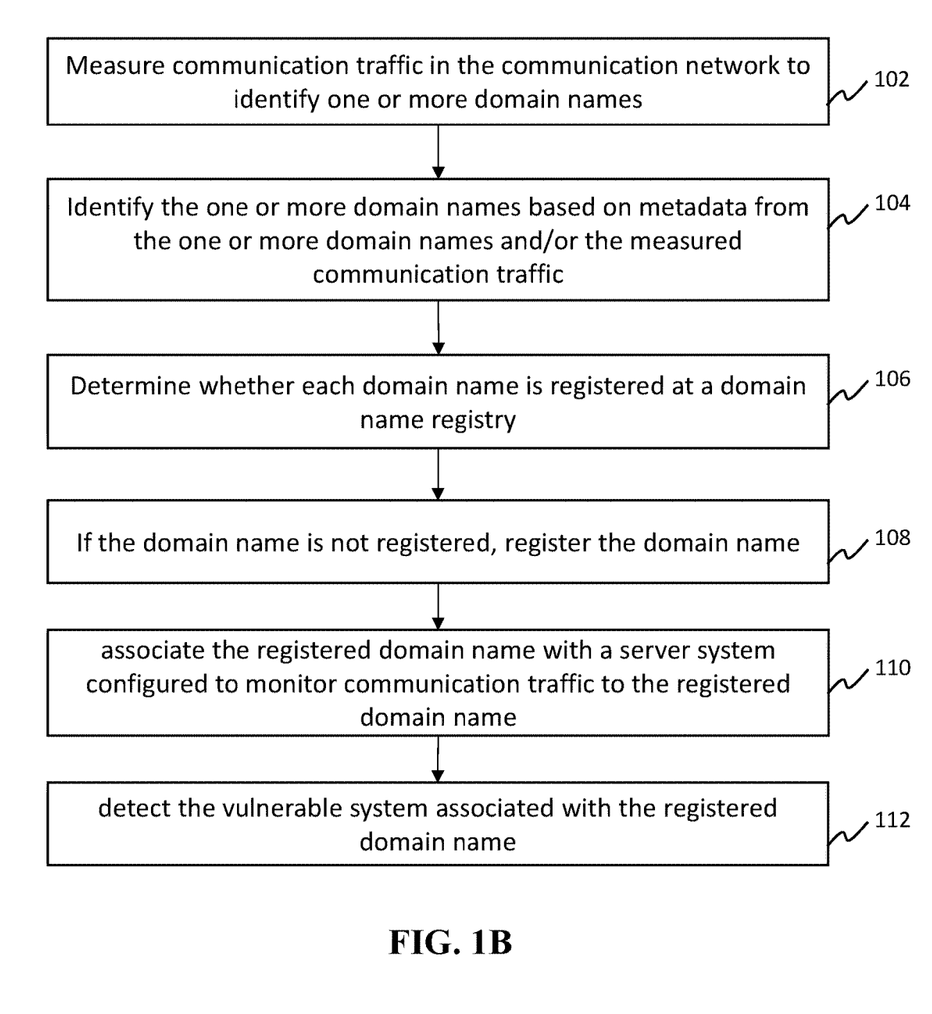
Figure 2:
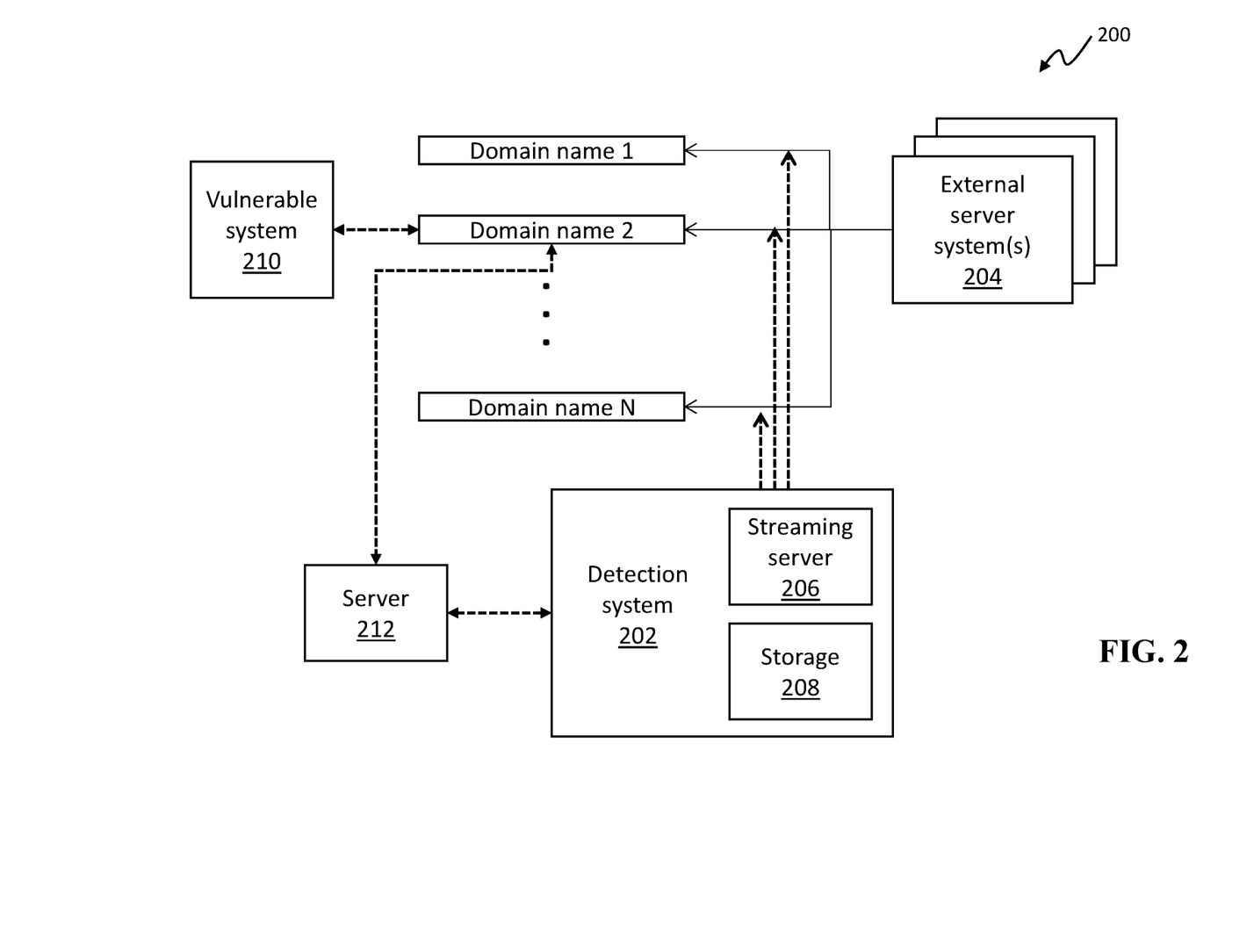
FIG. 2 is a diagram of an exemplary embodiment of a system for detecting vulnerable systems coupled to a communication network.

FIGS. 1A-1B are flowcharts of exemplary embodiments of methods for detecting vulnerable systems coupled to a communication network. FIG. 2 is a diagram of an exemplary embodiment of an environment 200 in which a system for detecting vulnerable systems coupled to, or part of, a communication network operates.

In step 102, the detection system 202 measures communication traffic in the communication network to identify a plurality of domain names of interest. The communication traffic can be originating from one or more external (separate from the system 200) server systems 204 in the communication network. External server systems can include company servers, desktop computers, Internet of things (IoT) devices, mobile devices, or any other device on external networks. In some embodiments, the communication traffic can be provided by one or more Internet service providers (ISPs). Many ISPs track communication traffic to domain names for standard business purposes. However, the monitoring and/or measuring of communication traffic is typically associated with large amounts of data. Thus, in some embodiments, metadata related to the measured communication traffic may be extracted from the communication traffic in the interest of efficiency. Metadata can include geographical location of the communication traffic, frequency of the communication traffic, magnitude of the communication traffic, aggregated counters of a number of unique Internet Protocol (IP) addresses per country, a number of events observed per period (e.g., every hour), a ratio between unique IPs versus a sum of a portion or all communication traffic. Efficiency may be crucial in some instances where a domain name may be associated with a flawed, but important Internet resource that is vulnerable to malware. In some embodiments, the ISPs can provide a list of domain names that are the subject of network traffic. This list of domain names can be analyzed to identify those that may be addresses for vulnerable systems. In some embodiments, the detection of nonexistent domain names being contacted by a group of devices does not necessarily map to malicious behavior. In some cases, the behavior can be mapped to a control failure associated with a software or service dependent on those domains. When that control failure occurs, the affected devices can become vulnerable to malicious actors that can potentially acquire the nonexistent domains and gain control over the associated devices.

In step 104, the detection system 202 identifies one or more domain names (1 through N) that each are vulnerable with regard to some property or attribute. For example, the domain name can have the following conditions associated therewith: (i) an unregistered domain name, (ii) a malfunctioning domain name, (iii) an abandoned domain name, and/or (iv) an algorithm-generated domain name. In some embodiments, the domain names can be identified based on the metadata extracted from the measured communication traffic and/or the domain names themselves. For example, a domain name may be identified based on statistical anomalies regarding traffic emanating from or directed to the domain name, or suspicious IP header information extracted from packets directed to the domain name. Examples include identification of a group of systems or devices attempting to contact nonexistent domain names at a given frequency, from a given set of geographies, and/or using specific protocols and/or payloads. This group of devices interacting with one or more domains, using a similar pattern and/or frequency, may be associated with automated traffic generated by malware, or may be caused by mis-configurations of machine-to-machine communication.

One important advantage to extracting metadata of the communication traffic is that much (or all) of the data from the traffic and associated parameters do not have to be stored. Instead, a detection system 202 can include a streaming server 206 that executes queries on the data in real time or near real time. In some embodiments, the extracted metadata can include geographical information related to the communication traffic. If so, for example, the detection system 202 can detect a group of domain names associated with a particular geography (such a city or region of a country) with significant incoming traffic. In some embodiments, the relative magnitude of traffic (or "cluster" of traffic) may be measured to identify domain names. For example, if one or a handful of parties are pinging "gogle.com," it is likely a mistake (such as mistyping). However, if thousands of parties are pinging the same domain name "gogle.com," the detection system 202 may identify that domain name as a candidate for registration. Thus, the measured traffic may be compared against an expected amount of traffic for the purpose of detection. Measures of expected amounts of traffic may be available from the ISPs themselves or other services. In another embodiment, the frequency of the traffic may be measured. An anomalous pattern of contacting a domain name may signify a vulnerability. For example, if the system 202 detects a group of devices periodically attempting to contact a domain, or group of domains, at a given frequency (for example, each hour), such a detection can be indicative of automated malicious traffic.

In some embodiments, the traffic data and/or data regarding the domain names may be stored and analyzed by accessing the storage 208. By determining one or more domain names having a vulnerable property or attribute, the detection system can ultimately detect and/or identify one or more vulnerable systems 210 associated with the domain name.

In step 106, the detection system 202 is configured to determine whether each domain name is registered at a domain name registry. In step 108, if the domain name is not registered, then the system 202 is configured to register the domain name. Once registered, in step 110, the system 202 can associate the registered domain name with a server system 212 configured to monitor communication traffic to the registered domain name. The server system 212 may be controlled by the detection system 202. In step 112, the detection system 202 can identify and/or detect one or more vulnerable systems associated with the registered domain name. Once the domain name (e.g., domain name 2 of FIG. 2) has been acquired and configured on the server system 212, the vulnerable system(s) 210 will typically contact the domain on the server system 212 using a specific network protocol and payload. Inspecting the network request by the vulnerable system 210 allows the detection system 202 to associate the vulnerable system(s) with malicious or other anomalous behavior that triggered the domain communication.

Computer-Based Implementations

In some examples, some or all of the processing described above can be carried out on a personal computing device, on one or more centralized computing devices, or via cloud-based processing by one or more servers. In some examples, some types of processing occur on one device and other types of processing occur on another device. In some examples, some or all of the data described above can be stored on a personal computing device, in data storage hosted on one or more centralized computing devices, or via cloud-based storage. In some examples, some data are stored in one location and other data are stored in another location. In some examples, quantum computing can be used. In some examples, functional programming languages can be used. In some examples, electrical memory, such as flash-based memory, can be used.

Figure 3:
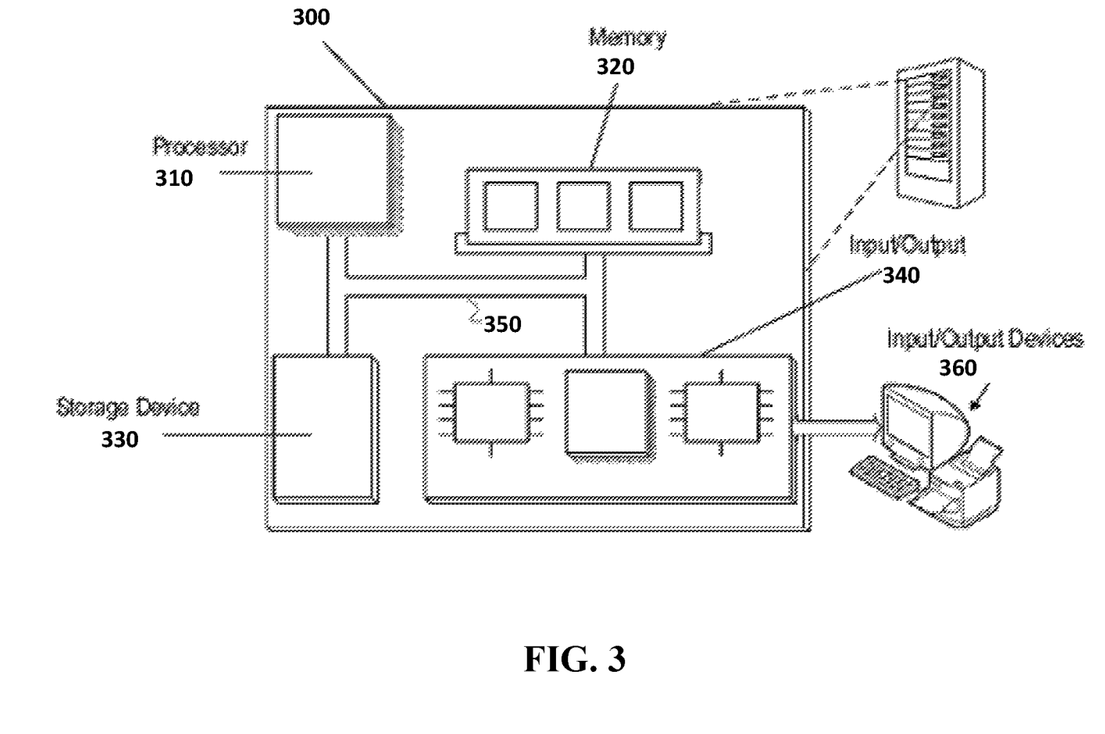
FIG. 3 is a block diagram of an example computer system that may be used in implementing the systems and methods described herein.

FIG. 3 is a block diagram of an example computer system 300 that may be used in implementing the technology described in this document. General-purpose computers, network appliances, mobile devices, or other electronic systems may also include at least portions of the system 300. The system 300 includes a processor 310, a memory 320, a storage device 330, and an input/output device 340. Each of the components 310, 320, 330, and 340 may be interconnected, for example, using a system bus 350. The processor 310 is capable of processing instructions for execution within the system 300. In some implementations, the processor 310 is a single-threaded processor. In some implementations, the processor 310 is a multi-threaded processor. The processor 310 is capable of processing instructions stored in the memory 320 or on the storage device 330.

The memory 320 stores information within the system 300. In some implementations, the memory 320 is a non-transitory computer-readable medium. In some implementations, the memory 320 is a volatile memory unit. In some implementations, the memory 320 is a nonvolatile memory unit.

The storage device 330 is capable of providing mass storage for the system 300. In some implementations, the storage device 330 is a non-transitory computer-readable medium. In various different implementations, the storage device 330 may include, for example, a hard disk device, an optical disk device, a solid-date drive, a flash drive, or some other large capacity storage device. For example, the storage device may store long-term data (e.g., database data, file system data, etc.). The input/output device 340 provides input/output operations for the system 300. In some implementations, the input/output device 340 may include one or more of a network interface devices, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices 360. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 330 may be implemented in a distributed way over a network, such as a server farm or a set of widely distributed servers, or may be implemented in a single computing device.

Although an example processing system has been described in FIG. 3, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

What is claimed is:

1. A computer-implemented method for external detection of a vulnerable system coupled to a communication network based on domain name properties, the method comprising:
    receiving communication traffic data from at least one service provider to identify at least one domain name associated with a vulnerable system, the communication traffic originating from at least one server system in the communication network;
    executing queries on the communication traffic to extract metadata while monitoring the communication traffic;
    identifying the domain name and an associated property indicative of vulnerability of the domain name based on the metadata, wherein the associated property indicative of vulnerability comprises communication traffic data from a geographical location and that is associated with the identified domain name;
    determining whether the domain name is registered at a domain name registry;
    if the domain name is not registered, registering the domain name based on a high frequency of domain names from a particular geographical location and having a property indicative of vulnerability in that particular geographical location; and
    detecting the vulnerable system associated with the registered domain name.

2. The method of claim 1, wherein each domain name having the property indicative of vulnerability is selected from the group consisting of: (i) an unregistered domain name, (ii) a misconfigured domain name, (iii) an abandoned domain name, and (iv) an algorithm-generated domain name.

3. The method of claim 1, wherein the vulnerable system is a malware-infected server system.

4. The method of claim 1, wherein the vulnerable system is a misconfigured server system.

5. The method of claim 1, further comprising:
    associating the registered domain name with a server system configured to monitor communication traffic to the registered domain name.

6. The method of claim 1, wherein receiving communication traffic to identify the domain name further comprises:
    comparing relative magnitude of communication traffic to an expected amount of traffic.

7. The method of claim 1, wherein receiving communication traffic to identify the domain name further comprises:

measuring a frequency of communication traffic to the domain name.

8. The method of claim 1, wherein the metadata further comprises data selected from the group consisting of: (a) frequency of the communication traffic, (b) magnitude of the communication traffic, (c) aggregated counters of a number of unique Internet Protocol (IP) addresses per country, (d) a number of events observed per period, and (e) a ratio of unique IP addresses to a sum of a portion of the communication traffic.

9. A system for external detection of a vulnerable system coupled to a communication network, the system comprising:
at least one computer system programmed to perform operations comprising:
receiving communication traffic data from at least one service provider on the communication network to identify at least one domain name associated with a vulnerable system, the communication traffic originating from at least one server system in the communication network;
executing queries on the communication traffic to extract metadata while monitoring the communication traffic;
identifying the domain name and an associated property indicative of vulnerability of the domain name based on the metadata, wherein the associated property indicative of vulnerability comprises communication traffic data from a geographical location and that is associated with the identified domain name;
determining whether the domain name is registered at a domain name registry;
if the domain name is not registered, registering the domain name based on a high frequency of domain names in a particular geographical location and having a property indicative of vulnerability in that particular geographical location; and
detecting the vulnerable system associated with the registered domain.

10. The system of claim 9, wherein each domain name having the property indicative of vulnerability is selected from the group consisting of: (i) an unregistered domain name, (ii) a misconfigured domain name, (iii) an abandoned domain name, and (iv) an algorithm-generated domain name.

11. The system of claim 9, wherein the vulnerable system is a malware-infected server system.

12. The system of claim 9, wherein the vulnerable system is a misconfigured server system.

13. The system of claim 9, wherein the operations further comprise:
associating the registered domain name with a server system configured to monitor communication traffic to the registered domain name.

14. The system of claim 9, wherein receiving communication traffic to identify the domain name further comprises:
receiving communication traffic data from one or more Internet service providers (ISP).

15. The system of claim 9, wherein receiving communication traffic to identify the domain name further comprises:
comparing relative magnitude of communication traffic to an expected amount of traffic.

16. The system of claim 9, wherein receiving communication traffic to identify the domain name further comprises:
measuring a frequency of communication traffic to the domain name.

17. The system of claim 9, wherein the metadata further comprises data selected from the group consisting of: (a) frequency of the communication traffic, (b) magnitude of the communication traffic, (c) aggregated counters of a number of unique Internet Protocol (IP) addresses per country, (d) a number of events observed per period, and (e) a ratio of unique IP addresses to a sum of a portion of the communication traffic.

18. A computer-implemented method for external detection of a vulnerable system coupled to a communication network based on domain name properties, the method comprising:
receiving communication traffic data from at least one service provider to identify at least one domain name associated with a vulnerable system, the communication traffic originating from at least one server system in the communication network;
executing queries on the communication traffic to extract metadata while monitoring the communication traffic;
identifying the domain name and an associated property indicative of vulnerability of the domain name based on the metadata, wherein the identified domain name is a misconfigured domain name and the associated property indicative of vulnerability comprises communication traffic data from a geographical location and that is associated with the identified domain name;
determining whether the domain name is registered at a domain name registry; and
if the domain name is not registered, registering the domain name based on a high frequency of domain names from a particular geographical location and having a property indicative of vulnerability in that particular geographical location.

19. A computer-implemented method for external detection of a vulnerable system coupled to a communication network based on domain name properties, the method comprising:
receiving communication traffic data from at least one service provider to identify at least one domain name associated with a vulnerable system, the communication traffic originating from at least one server system in the communication network;
executing queries on the communication traffic to extract metadata while monitoring the communication traffic;
identifying the domain name and an associated property indicative of vulnerability of the domain name based on the metadata, wherein the identified domain name is an algorithm-generated domain name and the associated property indicative of vulnerability comprises communication traffic data from a geographical location and that is associated with the identified domain name;
determining whether the domain name is registered at a domain name registry; and
if the domain name is not registered, registering the domain name based on a high frequency of domain names from a particular geographical location and having a property indicative of vulnerability in that particular geographical location.

* * * * *